UNITED STATES PATENT OFFICE.

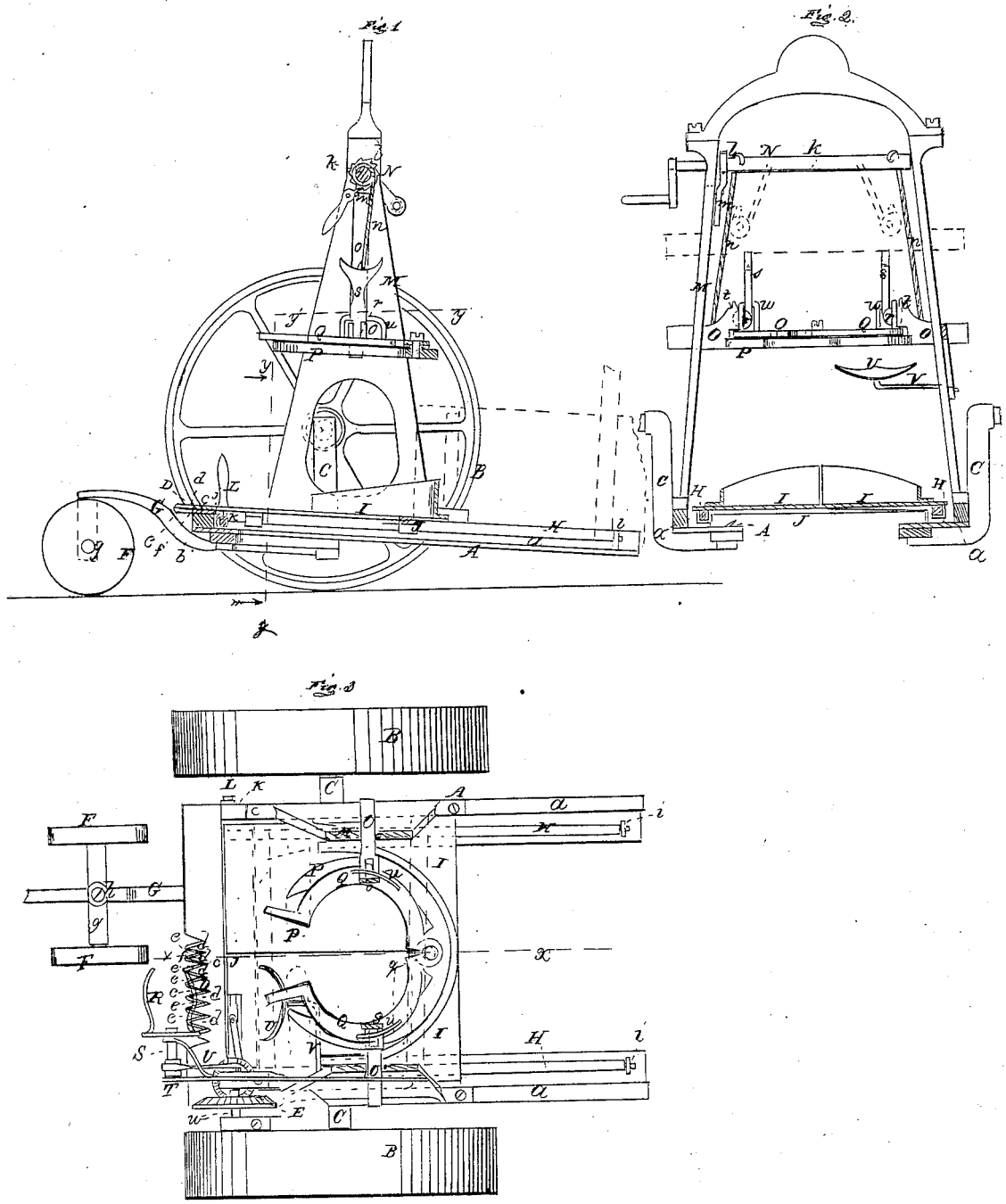

THOMAS H. STORMS AND JOHN C. POFFENBERGER, OF JACKSONVILLE, ILL.

IMPROVEMENT IN CORN-HARVESTERS.

Specification forming part of Letters Patent No. 45,282, dated November 29, 1864.

*To all whom it may concern:*

Be it known that we, THOMAS H. STORMS and JOHN C. POFFENBERGER, of Jacksonville, in the county of Morgan and State of Illinois, have invented a new and Improved Machine for Cutting and Shocking Corn; and we do hereby declare that the following is a full, clear, and exact description thereof, which will enable others skilled in the art to make and use the same, reference being had to the accompanying drawings, making a part of this specification, in which—

Figure 1 is a side sectional view of our invention, taken in the line $x\ x$, Fig. 3; Fig. 2, a transverse vertical section of the same, taken in the line $y\ y$, Fig. 1; Fig. 3, a horizontal section of the same, taken in the line $y'\ y'$, Fig. 1.

Similar letters of reference indicate like parts.

This invention relates to a new and improved machine, whereby standing corn may be cut and left upon the field in shocks, the whole work being done at one operation and with one and the same machine.

A represents the main frame of the machine, which is composed of two parallel side bars, $a\ a$, connected at their front ends by a cross-bar, $b$. This frame is mounted on two wheels, B B, the axles C of which are bent to admit of the wheels being large in diameter and the frame A being low or quite near the ground.

On the cross-bar $b$ of the frame A the cutting device D is placed, the same consisting of a stationary plate, $c$, provided with V-shaped stationary collars $d$, underneath which similar cutters, $e$, work, the latter being formed in a plate, $f$, which has a reciprocating motion given it by means of a crank and pitman and gearing E from one of the wheels B.

The front part of the frame A is sustained by a pair of small wheels, F F, the axle $g$ of which has its king-bolt $h$ passing through the front end of a bar, G.

H H are two parallel bars, placed one at each side of the frame A, and fitted in bearings $i\ i$, so that they are allowed to turn. On each side of these bars H there is fitted a sliding platform, I, one of which has a bar, J, projecting from it sufficiently far to bear or rest on the bar $a$ at the opposite side of the frame A, and serve as a support for the latter.

Underneath the front parts of the bars H H there is a bar or shaft, K, of flat form, and having a lip, $j$, attached to it at about its center, and a lever, L, attached to one end of it. This shaft, when turned up edgewise, raises the bars H H and platforms I I and keeps them in a more elevated position than when turned down flatwise.

M represents an upright framing, in the upper part of which there is a windlass, N, composed of a horizontal shaft, $k$, with a ratchet-wheel, $l$, upon it, into which a pawl, $m$, catches. This shaft $k$ has two cords or chains, $n\ n$, attached to it, which extend down and are connected to slides O O, which are fitted in vertical slots $o\ o$ in the sides of the framing M. These slides O O project from opposite sides of a horizontal annular frame, P, having an open space, $p$, at its front part, and to the rear of the frame P, on its upper surface, there are secured by one and the same pivot, $q$, two semicircular bars, Q Q. (Shown clearly in Fig. 3.)

To the inner end of each slide O there is secured by a pivot, $r$, a jaw, $s$. The inner ends of these jaws are of concave form, and at their outer ends they are bent upward and inward in hook form, as shown at $t$. The jaws $s$ both pass through loops $u\ u$, attached to the bars Q Q.

R is a reel, which is attached to a shaft, S, at the upper end of a bar, T. This reel is driven by a belt, $v$, from the shaft $w$ of one of the gears E.

U is a rest composed of a semicircular bar attached to a horizontal arm, V, which projects from the upright framing M.

The operation is as follows: As the machine is drawn along the corn is cut by the cutting device D, and is retained by the rest U, the reel R forcing the stalks into the rest, and when four or five hills are cut the attendant takes them from the rest U and places them within the frame P and between the bars Q Q. This operation is repeated until there are a sufficient number of stalks in the frame P to form a shock. The operator then draws together the distended front ends of the semicircular bars Q Q, and thereby causes the loops $u\ u$ to draw down the jaws $s\ s$, which grasp the upper part of the shock, the bars Q Q and jaws $s$ being raised or lowered to the desired height by means of the windlass N. The bar K is then turned flatwise, which lets down the platforms I I a trifle, and the lip $j$ throws back or starts the platforms, which are forced back to the rear of the bars H H, and the platforms are then turned upward out of the way. The operator then throws the pawl *m* out from the ratchet *l*, thereby liberating the stock which descends upon the ground with the butts of the stalks in a loose or spread state, affording a good base to support the shock and admitting of a circulation of air through the shock. The bars Q Q are then forced apart, and the loops *u u* strike the hooks *t* and throw up the jaws *s s*, and the frame P is raised to its former position. The platforms I are then turned down and shoved forward to the front part of the frame A, as before, the bar K turned edgewise, and the machine again started for a succeeding operation.

We claim as new and desire to secure by Letters Patent—

1. The adjustable or pivoted semicircular bars Q Q, in connection with the jaws *s s* and annular frame P, all constructed as shown, to operate substantially in the manner as and for the purpose set forth.

2. The windlass N, when used in combination with the annular frame P and its attached parts, substantially as and for the purpose specified.

3. The sliding and adjustable platforms I I, arranged in connection with the bars H H K, so as to admit of holding the stalks until they are grasped by the jaws *s s*, and then admit of being shoved back and turned upward to allow of the stock being discharged, as described.

4. The rest U, in combination with the reel R, cutting device D, movable or pivoted bars Q Q, jaws *s s*, annular frame P, slides O O, and windlass N, arranged on a mounted frame, substantially as and for the purpose specified.

THOS. H. STORMS.
JNO. C. POFFENBERGER.

Witnesses:
CHRIS. MICHAELS,
CHAS. L. HASTINGS.